July 31, 1928. Re. 17,057

W. J. VOIT

VALVE CONSTRUCTION FOR INFLATABLE ARTICLES

Original Filed April 23, 1927

INVENTOR:
William J. Voit,
BY
Fred A. Lewis
ATTORNEY.

Reissued July 31, 1928. Re. 17,057

UNITED STATES PATENT OFFICE.

WILLIAM J. VOIT, OF LOS ANGELES, CALIFORNIA, ASSIGNOR TO W. J. VOIT RUBBER CO., OF LOS ANGELES, CALIFORNIA, A CORPORATION OF CALIFORNIA.

VALVE CONSTRUCTION FOR INFLATABLE ARTICLES.

Original No. 1,644,096, dated October 4, 1927, Serial No. 186,023, filed April 23, 1927. Application for reissue filed April 5, 1928. Serial No. 267,766.

This invention relates to such devices as rubber cushions and balls which are adapted to be inflated with air when used, and the object of the invention is to provide a novel and thoroughly serviceable valve structure which may be easily placed and held in sealing position without protrusion or gapping of any of the parts.

Briefly stated, the invention resides in the positioning of valve parts entirely within a soft rubber article, said parts being flexible and including a soft rubber tube adapted to project through a slit in the article, the inner end of the tube being secured to a soft rubber piece in turn secured to the inner wall of said article. To prevent gapping or spreading of the slit a preferably non-elastic device is disposed between said wall and said rubber piece to span the slit, the tube being folded beneath said device to seal the same and prevent escape of air. Such other features of novelty as may be herein disclosed are also comprised in the invention.

In the accompanying drawings, wherein one embodiment of the invention is disclosed by way of illustration, Fig. 1 is a plan view of a rubber cushion equipped therewith.

Figure 1:
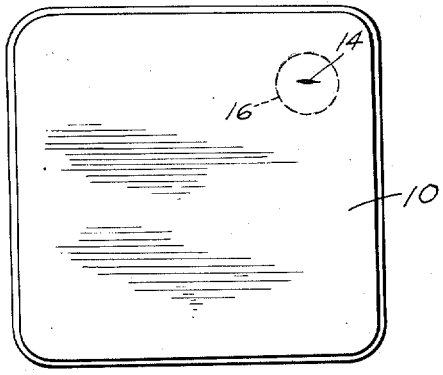

The cushion as shown (or other article) ordinarily will be composed of two sheets 10 of soft rubber vulcanized together at their edges, a soft rubber tube 12 being adapted to project through a slit 14 in one of said sheets. The inner end of the tube 12 is flanged and cemented or vulcanized at 15 to a soft rubber piece 16 which may be in the form of a disc and is cemented or preferably vulcanized at 18 to the inner wall of the article. Located within the space between said inner wall and said piece 16 is a fabric or other relatively inelastic element 20 also cemented or vulcanized at 22 to said inner wall, and in the particular form shown this element is composed of a plurality of parallel cords which extend transversely of the slit 14 and have their ends secured to the part 10. This device or element 20 is adapted to be separated to form an opening 20′ (Fig. 3) extending transversely of slit 14 to accommodate tube 12 when the latter is withdrawn, and to close over the tube when folded and tucked away under the element as in Fig. 6 when the same is to be sealed for use. The inelastic element 20 performs two functions; first, the retaining of the tube when folded, and second, the prevention of spreading or gapping of the slit 14 when said tube is folded away and the article is inflated. This disposition of the folded tube, together with the pressure exerted by the inflation, insures sufficient compression of the folded tube to effectually prevent escape of air. At the same time, the surface of the article remains smooth and uninterrupted after inflation and produces a desirable and attractive piece of goods. In manufacture the valve structure may be easily assembled by positioning the fabric section 20 and the piece 16 before the sheets 10 are assembled.

Figure 4:
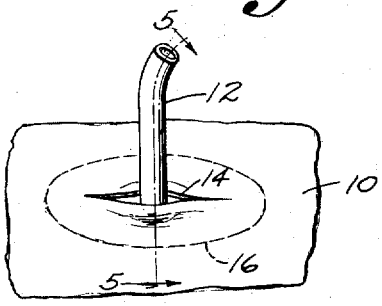
Fig. 4 is a perspective view showing the tube withdrawn.
Figure 2:
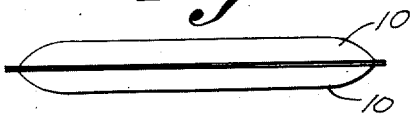
Fig. 2 is an edge elevation thereof.
Figure 3:
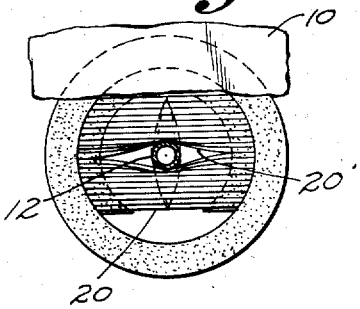
Fig. 3 is a fragmentary plan with parts broken away indicating the arrangement when the tube is withdrawn for inflation.
Figure 5:
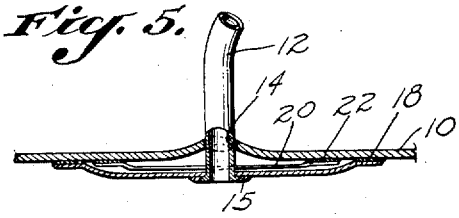
Fig. 5 is a section taken on the line 5—5 of Fig. 4.
Figure 6:
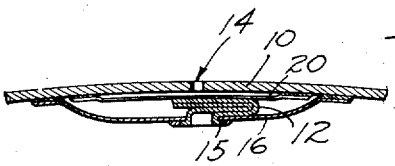
Fig. 6 is a similar section showing the tube folded and tucked away to seal the same against loss of air.

To inflate the device, the tube 12 is withdrawn through the slit 14 by spreading the cords 20 to form an opening as at 20′ in Fig. 3, the tube assuming the position of Figs. 4 and 5. When the article is properly inflated the tube is folded and tucked under the cords which close over the folded tube and retain the same as seen in Fig. 6. Fig. 1 represents the external appearance when the parts are in operative relation.

I claim as my invention:

1. An inflatable article having a slit therein, a member secured to an inner wall of the article beneath said slit, and a tube secured in said member and adapted to be folded in the space between said inner wall and member.

2. An inflatable article having a slit therein, a member secured to an inner wall of the article beneath the slit, relatively inelastic element secured between the inner wall and the element and adapted to be spread beneath said slit, and a tube secured to said member, said tube being adapted to project through said slit and through said element when spread and to be folded beneath said slit to maintain inflation.

3. An inflatable article having a slit therein, a piece within the article and sealed against the inner wall thereof beneath said slit, a tube sealed in said piece and adapted to project through said slit, a fabric element secured to said inner wall between said inner wall and said piece and beneath said slit, said element being relatively inextensible in a direction transverse to said slit and being adapted to be separated to pass said tube.

4. An inflatable device having a slit therein, a piece sealed on an inner wall thereof beneath said slit, a series of cords secured to said inner wall beneath said slit and between said inner wall and said piece, and a foldable tube sealed in said piece and adapted to project through said slit.

5. An inflatable article comprising: a hollow body having an elastic wall, said wall having a small slit therein; a member secured in gas-tight relationship to the inner side of said wall in a narrow zone entirely surrounding said slit, thus forming a pocket between said wall and said member, said slit opening into said pocket; and a flexible tube secured in gas-tight relationship to said member, connecting with the interior of said body and so positioned as to be readily withdrawn for inflation through said slit, said pocket being of sufficient size to allow the tube to be inserted in folded position through the slit into said pocket.

6. An inflatable article comprising: a hollow body having an elastic wall, said wall having a small slit therein; a highly elastic member secured in gas-tight relationship to the inner side of said wall in a narrow zone entirely surrounding said slit, thus forming a pocket between said wall and said member, said slit opening into said pocket; and a flexible tube secured in gas-tight relationship to said member, connecting with the interior of said body and so positioned as to be readily withdrawn for inflation through said slit, said pocket being of sufficient size to allow the tube to be inserted in folded position through the slit into said pocket.

7. An inflatable article comprising: a hollow body having an elastic wall, said wall having a small slit therein; a member secured in gas-tight relationship to the inner side of said wall in a narrow zone entirely surrounding said slit, thus forming a pocket between said wall and said member, said slit opening into said pocket; and a flexible tube secured in gas-tight relationship to said member, connecting with the interior of said body and so positioned as to be readily withdrawn for inflation through said slit, said pocket being of sufficient size to allow the tube to be inserted in folded position through the slit into said pocket.

8. An inflatable article comprising: a hollow body having an elastic wall, said wall having a small slit therein; a member secured in gas-tight relationship to the inner side of said wall in a narrow zone entirely surrounding said slit, thus forming a pocket between said wall and said member, said slit opening into said pocket; a non-elastic element extending over the area inside said zone and reinforcing said wall within said zone; and a flexible tube secured in gas-tight relationship to said member, connecting with the interior of said body and so positioned as to be readily withdrawn for inflation through said slit, said pocket being of sufficient size to allow the tube to be inserted in folded position through the slit into said pocket.

9. An inflatable article comprising: a hollow body having a wall which is of two layers over a restricted area, the two layers forming a pocket situated between the two layers, the outer layer having a small opening communicating with said pocket; and a flexible tube secured in the inner layer and so placed that it may be withdrawn through said opening for inflation and tucked into said pocket when inflated.

10. An inflatable article comprising: a hollow body having a wall which is of two layers over a restricted area, the two layers forming a pocket situated between the two layers, the outer layer having a small opening communicating with said pocket; non-elastic means secured in said wall and so placed as to prevent elastic deformation of said wall in said area; and a flexible tube secured in the inner layer and so placed that it may be withdrawn through said opening for inflation and tucked into said pocket when inflated.

In testimony whereof, I have hereunto set my hand at Los Angeles, California, this 30th day of March, 1928.

WILLIAM J. VOIT.